United States Patent
Dantin et al.

(10) Patent No.: US 9,353,009 B2
(45) Date of Patent: May 31, 2016

(54) DRY COMPOSITION BASED ON MINERAL BINDER AND INTENDED FOR THE PREPARATION OF A HARDENABLE WET FORMULATION FOR THE CONSTRUCTION INDUSTRY

(75) Inventors: Véronique Dantin, Saint-Quentin Fallavier (FR); Paulo Goncalo, Saint-Quentin Fallavier (FR); Stéphanie Persoz, Saint-Quentin Fallavier (FR)

(73) Assignee: PAREXGROUP SA, Issy les Moulineaux (FR)

( * ) Notice: Subject to any disclaimer, the term of this patent is extended or adjusted under 35 U.S.C. 154(b) by 0 days.

(21) Appl. No.: 13/513,498

(22) PCT Filed: Mar. 9, 2012

(86) PCT No.: PCT/EP2012/054166
§ 371 (c)(1),
(2), (4) Date: Jul. 20, 2012

(87) PCT Pub. No.: WO2013/131583
PCT Pub. Date: Sep. 12, 2013

(65) Prior Publication Data
US 2014/0371351 A1 Dec. 18, 2014

(51) Int. Cl.
C04B 28/04 (2006.01)
C04B 28/06 (2006.01)
C04B 24/26 (2006.01)
B01F 3/12 (2006.01)
C04B 28/10 (2006.01)
C04B 28/02 (2006.01)
C04B 103/00 (2006.01)

(52) U.S. Cl.
CPC ............. *C04B 28/10* (2013.01); *B01F 3/1214* (2013.01); *B01F 3/1228* (2013.01); *C04B 24/2641* (2013.01); *C04B 24/2652* (2013.01); *C04B 28/02* (2013.01); *C04B 28/04* (2013.01); *B01F 2215/006* (2013.01); *B01F 2215/0047* (2013.01); *C04B 2103/0051* (2013.01); *C04B 2201/32* (2013.01)

(58) Field of Classification Search
CPC .... C04B 28/04; C04B 28/06; C04B 24/2641; C04B 24/2652
See application file for complete search history.

(56) References Cited

U.S. PATENT DOCUMENTS

| 7,288,147 B2 | 10/2007 | Christensen et al. |
| 2003/0144386 A1 | 7/2003 | Pakusch et al. |
| 2010/0190888 A1 | 7/2010 | Gaeberlein et al. |

FOREIGN PATENT DOCUMENTS

| FR | 2955103 | 7/2011 |
| FR | 2955104 | 7/2011 |

OTHER PUBLICATIONS

Portland Cement—Wikipedia (downloaded Feb. 3, 2015).*
"Portland Cement Hydration" by Dr. Kimberly Kurtis, published online in 2007 at http://people.ce.gatech.edu/~kk92/hyd07.pdf.*
"Appendix A: Overview of Portland Cement and Concrete" (May 11, 2015) http://www.epa.gov/epawaste/conserve/tools/cpg/pdf/app-a.pdf.
"Cement Chemist Notation" (May 11, 2015) http://en.wikipedia.org/wiki/Cement_chemist_notation.
"Portland cement" (Feb. 3, 2015) http://en.wikipedia.org/wiki/Portland_cement.
Zhu, H.; "Computer Simulated Crystal Structures of Major Chemical Compounds in Portland Cement" Presentation at University of Massachusetts—Lowell, Jul. 20, 2009.

* cited by examiner

*Primary Examiner* — Vu A Nguyen
(74) *Attorney, Agent, or Firm* — Vedder Price P.C.; Thomas J. Kowalski; Deborah L. Lu

(57) ABSTRACT

The invention relates to a dry composition for the preparation of a wet formulation for the construction industry.
The aim of the invention is to provide a dry composition that results in hardened products for the construction industry having an excellent compromise between its lightweight properties and mechanical properties; optimizing the hydration of the binder; and making possible a stable lightweight property without excessive increase in volume.
To this end, the composition according to the invention is based on a mineral binder (a) and incorporates at least one SuperAbsorbent Polymer (SAP) (b) and an accelerator component (c), characterized in that it comprises at least one source of aluminum ions and, optionally, (d) a setting retarder, (e) an additional setting accelerator; (f) a water-retaining agent; (g) a filler; (h) a lightweight filler, (i) a water repellent; (j) a coloring agent; (k) fibers; (l) an anti-foaming agent; (m) a redispersible powder resin; (n) a rheological agent; (o) an air-entraining or foaming agent; (p) a gas-generating agent; (q) a fire retardant.
The wet formulation obtained by mixing this dry composition with water, the methods for preparing this dry composition and the corresponding wet formulation, the construction products obtained from the wet formulation and the structures produced with these products, are other subjects of the invention.

13 Claims, No Drawings

DRY COMPOSITION BASED ON MINERAL BINDER AND INTENDED FOR THE PREPARATION OF A HARDENABLE WET FORMULATION FOR THE CONSTRUCTION INDUSTRY

CROSS REFERENCE TO RELATED APPLICATIONS

This application is a §371 National Stage Application of PCT/EP2012/054166, filed Mar. 9, 2012.

BACKGROUND OF THE INVENTION

1. Field of the Invention

The technical field of the invention is that of powder compositions intended for the preparation of wet formulations for the construction industry, for example renders, mortars, concretes or adhesives for construction.

These wet formulations can be obtained:
directly by mixing the powder compositions on site (e.g. renders, mortars, concretes or adhesives for construction),
by mixing the powder compositions on industrial sites to produce prefabricated parts such as for example plates, concrete blocks or monomer blocks.

More precisely, the invention relates to dry compositions based on mineral binders and a SuperAbsorbent Polymer (SAP) that are capable, after mixing with water at high mixing ratios, for example greater than 50%, of producing wet formulations that make it possible to produce lightweight hardened articles, such as exterior or interior coverings or renders (e.g. exterior thermal insulation system (ETI)/decoration/protection/waterproofing), adhesives, solid objects, etc.

2. Description of Related Art

In this technical field, there is a constant need for a "foam" system that incorporates air into the wet or hardened renders, mortars and concretes, so as to make them lighter and give them beneficial properties in particular as regards sound and/or thermal insulation and thermal resistance or fire resistance. These low-density wet render, mortar or concrete foams must also have good workability or handling. The sound and/or thermal insulation properties of these render, mortar or concrete foams would be particularly acceptable for floor coverings or resurfacing, exterior renders for protecting facades and firestop mortars, among others.

A certain number of admixtures for render, mortar or concrete compositions are already known, the function of which is to generate gases in situ and therefore to form a foam after mixing and porosity after hardening. This is the case in particular for aluminium powders capable of producing hydrogen in an aqueous or alkaline medium, as well as for hydrogen peroxide, which quickly releases oxygen when it comes into contact with catalysts such as silver or potassium permanganate. Other families of admixtures that generate gas in situ in a cementitious medium, such as oxygen, nitrogen, hydrogen, carbon dioxide, carbon monoxide, ammonia and methane, are described in U.S. Pat. No. 7,288,147B by the company Construction Research & Technology.

The lightweight blocks of the YTONG® type and the lightweight walls marketed by the company XELLA® are obtained by autoclaving blocks of calcium silicate that have previously been made lighter by introducing aluminium powder, which generates hydrogen. These prefabricated elements have properties of thermal insulation and mechanical strength allowing their use as structural elements (in the case of Thermopierre blocks, which have a lambda value close to 0.12 W/m·K t and mechanical strength of 3-5 MPa approximately) or as non-bearing cladding elements, contributing additional thermal insulation (in the case of Multipor® cladding, which has a lambda value close to 0.048 W/m·K and mechanical strength of 0.5 MPa). Obtaining these elements requires aluminium powder to be handled, which requires particular precautions in view of its explosive nature. Moreover, a costly autoclaving stage is necessary to confer the necessary mechanical strength on these elements. This technique therefore cannot be used on site. Moreover, with respect to the production of prefabricated parts, there is a demand for alternative technologies for the production of prefabricated elements having the same types of mechanical and thermal insulation performance, which avoid the use of aluminium powder (eliminating the potential problems of explosion) and which avoid the costly autoclaving stage: energy cost, low productivity and specific investments.

Air-entraining admixtures are also known for renders, mortars and concrete, the purpose of which is to trap the surrounding air, during blending with water (mixing) of the dry compositions of renders, mortars or concrete. These air-entraining agents are for example surfactants, fatty acids and alkali salts of fatty acids such as sodium lauryl sulphate. Such known air-entraining admixtures are capable of improvement.

In fact, all of the difficulty of this route of production of foams by air-entrainment lies in the stabilization of the air trapped within the wet matrix of render, mortar or concrete.

This stabilization is even more problematical in that it must not be obtained to the detriment of the standard properties (e.g. ease of use) of the wet forms of render, mortar or concrete foams, or to the detriment of the properties (in particular mechanical) expected for the hardened forms of these foams.

Moreover, the stability of the foam must also be present at each stage of the preparation and application processes. This must be embodied by a density that does not vary during each stage, whether in the mixing vat, after passing through the pipes (lance output density l.o.d.) or during spraying, when the application is carried out in this way. Conversely, this density can be different between each stage. The reproducibility and reliability of the method of producing these foams, although problematical in an industrial environment, pose a real problem of robustness when use directly on site by unqualified operators is envisaged. In practice, their use on site is very limited as it requires highly qualified labour.

In order to improve this route of production of air-entraining foams, FR2955103A proposes a dry composition for the preparation of render, mortar or concrete foams for the construction industry, which become porous once hardened, so that they are lightweight, thermally and/or sound insulating, both in paste form and hardened form, and which are obtained by air-entrainment during mixing. This composition includes a foaming admixture comprising:
A. a modified starch ether having a Brookfield viscosity comprised between 500 and 25,000 mPa·s;
B. a stabilizer comprising at least one linear polyacrylamide;
C. a film-forming polymer.

FR2955104A relates to a thermally-insulating material with a cellular structure comprising by weight relative to the total weight of the material: −4 to 96% of a hydraulic binder characterized, before coming into contact with water, in that it comprises at least one phase chosen from C3A, CA, C12A7, C11A7CaF2, C4A3$ (ye'elimite), C2A$_{(1-x)}$F$_x$ (with C→CaO; A→Al$_2$O$_3$; F→Fe$_2$O$_3$ and x belonging to ]0, 1]), amorphous hydraulic phases having a molar ratio C/A comprised between 0.3 and 15 and such that the cumulative Al$_2$O$_3$ content of these phases is comprised between 3 and 70% by weight of the total hydraulic binder, −4 to 96% of at least one filler; said material having a coefficient of thermal conductivity at 20° C. that is equal to or less than 0.20 W/m·° C. This thermally-insulating material is obtained from a foam.

These aqueous foams according to FR2955103 & FR2955104 can be improved, as, on the one hand, their stability is not infallible, and, on the other hand, their blending with a cement slurry is an incorporation operation that must be carried out carefully in order to avoid breaking down these foams. Such an operation is difficult to carry out under on-site conditions and requires the use of specific machines.

It is also important that the gain in terms of being lightweight is not achieved to the detriment of the other properties required for structures obtained from the wet formulations of renders, mortars and concretes, produced from dry cementitious compositions. This relates to the properties of the wet formulation: ease of use, workability, "pumpability", rheology, ease of blending and application, as well as cleaning the tools, and the properties of the hardened products obtained from this wet formulation: protection/waterproofing, thermal and sound insulation, hardness, crack resistance, flexural strength, compressive strength, and durability.

a) 10 to 95 percent by weight of a cement-containing hydraulic binder, b) 5 to 75 percent by weight of mineral fillers and/or organic fillers, c) 0.5 to 10 percent by weight of a redispersible polymer powder, d) 0.1 to 1.5 percent by weight of a water-retaining agent that is based on polysaccharide structures and is preferably chosen from the group constituted by ethers of methyl hydroxypropyl cellulose (MHPC) and/or methyl hydroxyethyl cellulose (MHEC), e) 0.3 to 4.0 percent by weight of an additional setting accelerator chosen from the group constituted by calcium formate, calcium chloride, calcium nitrate and f$_a$) or f$_b$) 0.02 to 2.0 percent by weight of an acrylic copolymer of the pulverulent anionic or cationic type, which is preferably capable of swelling by means of water or salt solutions and is particularly preferably insoluble in water and can advantageously be prepared by radical polymerization of unsaturated ethylene vinyl compounds; f$_a$) or f$_b$) having a particle size distribution that is determined in accordance with standard 420 EDANA.2-02, such that more than 98% by weight pass through a sieve having a mesh size of 200 µm. The compositions disclosed are:

| Tile adhesive | Tile adhesive | Composite thermal insulation system |
|---|---|---|
| a) CEM II A 42.5 R | a) Portland cement CEM I | a) Portland cement (for example CEM I 42.5 R) |
| b) Lightweight silica filler | b) Silica sand and calcareous aggregates | b) Silica sand or comminuted limestone |
| c) Vinyl acetate ethylene copolymer | c) Vinyl acetate ethylene copolymer | c) Vinyl acetate ethylene copolymer |
| d) Hydroxypropyl methylcellulose | d) Hydroxypropyl methylcellulose and starch ether | d) Hydroxypropyl methylcellulose |
| e) Calcium formate | e) Calcium formate accelerator | e) Calcium formate |
| f$_a$) Copolymer 1 (anionic): 0.96% | fa) Copolymer 1 (anionic) or fb) copolymer 2 (cationic): 0.30 or 0.45% | f$_a$) Copolymer 1 (anionic) or f$_b$) copolymer 2 (cationic): 0.30 or 0.4% |
| Cellulose fibres Sodium bentonite FeSO4—7H2O | Cellulose fibres | |
| Mixing ratio: 76% | Mixing ratio: 36% | Mixing ratio: 25% |

Patent application US2003/144386A describes mixtures of hydraulically setting building materials, comprising less than 2% by weight of particles of a size greater than 200 µm of a polymer capable of forming a hydrogel. In particular, US 2003/144386 discloses standard mortars prepared according to standard EN 196 (1,350 g of standardized sand-450 g of cement-225 g of water for mixing), in which are incorporated 0.5% by weight of the SuperAbsorbent Polymers (SAP) Hysorb® C3746-1 & C Hysorb® 3746-5 from BASF® having less than 2% by weight of particles of a size greater than 200 µm as well as a comparative SAP Hysorb® C 7015 from BASF® having substantially more than 2% by weight of particles of a size greater than 200 µm. These three mortars are compared with each other and with the standard mortar without SAP. The SAPs Hysorb® C3746-1 & C Hysorb® 3746-5 make it possible to increase the compressive and flexural strength of the hardened finished products obtained from these mortars, compared with those obtained via the standard mortar without SAP.

Patent application US2010/190888A describes a dry mixture of hydraulically setting building materials, preferably a tile adhesive in accordance with standard EN 12004, characterized in that it comprises:

The compositions according to application US2010/190888 aim to improve the yield, namely the ratio between the volume of the wet formulation and the mass of the dry mortar, for economic reasons (e.g. reducing the stocks of dry mortar). The use of calcium formate or other calcium salts contributes to the increase in the setting rate according to application US2010/0190888A.

SUMMARY

In this context, the technical problem at the heart of the present invention is satisfying at least one of the objectives listed hereinafter:

(i) Providing a dry (e.g. cementitious) composition that results, after mixing, in high-performance wet formulations (pastes-renders-mortars-concretes-adhesives) and, after hardening, in lightweight construction products.

(ii) Providing a dry (e.g. cementitious) composition that results, after mixing, in wet formulations (renders-mortars-concretes-adhesives) rich in mixing liquid (e.g. water) and, after hardening, in lightweight construction products, with improved ratios between the volume of wet formulation (paste) and the volume or mass of dry composition, in particular compared with the conventional reference compositions such as those according to application US2010/190888.

(iii) Providing a dry (e.g. cementitious) composition that results, after mixing, in wet formulations (renders-mortars-concretes-adhesives) rich in mixing liquid (e.g. water) and, after hardening, in lightweight construction products, with improved ratios between the volume of wet formulation (paste) and the volume or mass of dry composition, these lightweight products allowing a decrease in the ecological footprint of the composition by reducing the $CO_2$ emissions during transport.

(iv) Providing a dry (e.g. cementitious) composition that results, after mixing, in wet formulations (renders-mortars-concretes-adhesives) rich in mixing liquid (e.g. water) and, after hardening, in lightweight construction products, with improved ratios between the volume of wet formulation (paste) and the volume or mass of dry composition, these lightweight products making the work less heavy for the user by making lighter bags available for an identical worked surface.

(v) Providing a dry (e.g. cementitious) composition that results, after mixing, in wet formulations (renders-mortars-concretes-adhesives) rich in mixing liquid (e.g. water), and comprising at least one and a half times the quantity of water contained in a conventional mortar without superabsorbent.

(vi) Providing a dry (e.g. cementitious) composition that results, after mixing with a liquid (e.g. water), in wet formulations (renders-mortars-concretes-adhesives) that can be easily sprayed, are simple to use, have a consistency and a viscosity of the paste allowing pumping by a cement gun, a suitability for pumping, a workability that is sufficiently long to carry out the mixing and the application in particular of renders, while remaining economical, and stable after mixing.

(vii) Providing a dry (e.g. cementitious) composition that results, after mixing with a liquid (e.g. water), in wet formulations (renders-mortars-concretes-adhesives) that make it possible to produce protective/waterproof coverings, even optionally decorative coverings.

(viii) Providing a dry (e.g. cementitious) composition, according to paragraph (vii), that results, after mixing with a liquid (e.g. water), in wet formulations (renders-mortars-concretes-adhesives) which, once applied onto a support, or once formed or even once poured between two walls or into a formwork, then hardened, have reduced thermal conductivity $\lambda$ ($W \cdot m^{-1} \cdot K^{-1}$) less than or equal to 1, more preferably of 0.85.

(ix) Providing a dry (e.g. cementitious) composition, according to at least one of paragraphs (i) to (viii), which is moreover sufficiently stable in the wet (paste) form after mixing, to be capable of being applied or shaped and has durable mechanical properties in the hardened form.

(x) Providing a dry (e.g. cementitious) composition that results, after mixing, in high-performance wet formulations (pastes-renders-mortars-concretes-adhesives) and, after hardening, in lightweight prefabricated parts for the construction industry, without the need for a costly autoclaving stage.

(xi) Providing a wet formulation, obtained by mixing with a liquid (e.g. water), of the cementitious composition mentioned in the above objectives, said wet formulation having at least one of the above-mentioned properties.

(xii) Providing methods for preparing the cementitious composition and the corresponding wet formulation that are easy to carry out and are economical.

(xiii) Providing lightweight hardened products (prefabricated or not) for the construction industry obtained by means of the wet formulation mentioned in the above-mentioned objectives (pastes-grouts-renders-mortars-concretes, mortar-adhesive compositions, concrete blocks, sandwich panels), simple to obtain (without dangerous aluminium powders), economical (without autoclaving), endowed with good long-term mechanical performance (hardness, flexural/compressive strength, durability, cohesion) and having good performance in use.

DETAILED DESCRIPTION OF A PREFERRED EMBODIMENT

The above-mentioned problem is solved by the invention, which proposes an optimized dry composition, intended for the preparation of a wet formulation for the construction industry, comprising a source of aluminium ions $Al^{3+}$.

Hence, it follows that the present invention relates, in a first aspect, to a dry composition based on mineral binder (a) and incorporating at least one SuperAbsorbent Polymer (SAP) (b) and an accelerator component (c). This composition intended for the preparation of a wet formulation for the construction industry is characterized in that it comprises at least one source of aluminium ions.

The use of this composition a)b)c) makes it possible to obtain hardened products for the construction industry having an excellent compromise between its lightweight properties and mechanical properties.

This composition a)b)c) optimizes the hydration of the binder. Moreover, the lightweight property is acquired without excessive increase in the volume, such as is the case with the foaming admixtures. Moreover, this lightweight property is stable.

The invention makes it possible to obtain high ratios between the volume of wet formulation (paste) and the volume or mass of dry composition. This contributes to reducing the ecological footprint: lower transport costs for the dry composition and less heavy work for the users, for a given worked area, both with regard to the handling of the dry composition and the wet formulation and to the application of the latter. On-site safety is increased as a result.

It must be noted that the composition according to the invention makes available wet formulations that are easy to prepare, easy to use, with suitable rheology and workability and, in fine, coverings or hardened solid objects (prefabricated or not) having mechanical properties that are fully satisfactory and stable over time. The requirements are also met in respect of the specifications for decoration, protection and waterproofing. Moreover, the composition according to the invention can result in hardened coverings having good fire resistance.

According to another aspect, the invention relates to a method for preparing the composition according to the invention, characterized in that it essentially consists of mixing the components of said composition.

According to another aspect, the invention also relates to a wet formulation for the construction industry, characterized in that it comprises the composition according to the invention and a liquid, preferably water, preferably at a mixing ratio greater than or equal to 25% by weight, preferably 40% by weight.

In particular, the wet formulation (render, mortar, concrete) according to the invention is endowed with good performance in use such as the "workability" and rheological properties suitable for pumping. Moreover, this render has in particular good mechanical performance According to another aspect, the invention relates to a method for preparing the wet formulation according to the invention, characterized in that it essentially consists of blending a liquid, preferably water, with all or some of the components of the composition according to the invention, the remainder of the components then being incorporated gradually into the mixture if this has not been done beforehand.

According to another aspect, the invention relates to a hardened construction product obtained from the wet formulation according to the invention.

According to another aspect, the invention relates to a building or civil engineering structure produced at least partly with a wet formulation according to the invention, this formulation hardening after application and shaping.

According to another aspect, the invention relates to a method for application on a building surface or fabrication of a civil engineering building structure by means of the wet formulation as mentioned above.

According to another aspect, the invention relates to the use of at least one SuperAbsorbent Polymer (SAP) to increase the hydration rate of a dry composition based on hydraulic binder (a), incorporating at least one SuperAbsorbent Polymer (SAP) (b), and intended for the preparation of a wet formulation for the construction industry.

DEFINITIONS

In the whole of the present disclosure, any singular denotes either a singular or a plural.

The definitions given hereinafter by way of example can be used for the interpretation of the present disclosure:
"polymer" denotes either "homopolymer" or "copolymer";
"mortar" denotes a dry or wet or hardened mixture of one or more organic and/or mineral binders, containing aggregate with a diameter<5 mm (sands-aggregates), and optionally fillers and/or additives and/or admixtures;
"render" denotes more particularly a mortar used as a superficial covering for a surface in order to protect, homogenize, decorate it, etc.;
"adhesive" denotes a dry, wet or hardened composition, used to bond tiles onto a support;
"paste" denotes a wet composition containing water;
"filler" is a filler the bulk density of which is greater than 0.75;
"lightweight filler" is a filler the bulk density of which is less than or equal to 0.75;
"liquid": dispersion, emulsion or solution with an aqueous base.

Dry Composition

It is to the inventors' credit that they propose a dry (e.g. cementitious) composition which results, after hardening (e.g. mixing with water), in the formation of hardened products for the construction industry that are lightweight, mechanically strong, compact and have high volume of wet formulation (paste)/volume or mass of dry composition yield.

In a $1^{st}$ embodiment of the composition according to the invention, the mineral binder (a) contains at least one source of aluminium ions. In other words, the mineral binder (a) is for example a source of aluminium ions.

Preferably, in this $1^{st}$ embodiment, the concentration of binder (a) is comprised within the following concentration ranges, expressed as a % of dry weight of the composition and given in increasing order of preference: [15-95] [15-85]; [15-80]; [20-75].

In a $2^{nd}$ embodiment of the composition according to the invention, the binder (a) is not a source of aluminium ions.

Thus, preferably, in this case, the accelerator component (c) contains at least one source of aluminium ions. In other words, the accelerator component (c) is for example a source of aluminium ions.

In this second embodiment, it is advantageous that:
the concentration of binder (a) is comprised within the following concentration ranges, expressed as a % of dry weight of the composition and given in increasing order of preference:
[15-99.5]; [20-98]; [25-97]; [25-96]; [30-95]
and the concentration of accelerator component (c) is comprised within the following concentration ranges, expressed as a % of dry weight of the composition and given in increasing order of preference:
[0.10-20]; [0.15-20]; [0.15-15]; [0.15-10]; [0.2-10]

In a $3^{rd}$ embodiment of the composition according to the invention, the accelerator component (c) and the mineral binder (a) each contain at least one source of aluminium ions. In other words, the accelerator component (c) is for example a source of aluminium ions and the mineral binder (a) is for example a source of aluminium ions.

Mineral Binder (a)

Preferably, the mineral binder (a) is chosen singly or in combination from the group comprising:
(i) mineral binders that do not contain any source(s) of aluminium ions, preferably from Portland cements and/or slag cements, geopolymer cements, natural pozzolanas, fly ash, supersulphated cements, calcium sulphates (gypsum, hemihydrate and/or anhydrite), lime (unslaked, slaked and/or hydraulic), and/or potassium, sodium, and/or lithium silicates;
(ii) mineral binders that contain one or more sources of aluminium ions are chosen singly or in combination;
preferably from the calcium aluminate cements (CAC) and/or calcium sulphoaluminate (CSA) cements and/or binders having a high content of alumina-rich cementitious phases;
and even more preferably from hydraulic binders comprising:
at least one phase chosen from $C_3A$, $CA$, $C_{12}A_7$, $C_{11}A_7CaF_2$, $C_4A_3\$$ (ye'elimite), $C_2A_{(1-x)}F_x$ (with $C \rightarrow CaO$; $A \rightarrow Al_2O_3$; $F \rightarrow Fe2O3$ and x belonging to ]0, 1]),
amorphous hydraulic phases having a molar ratio C/A comprised between 0.3 and 15,
and such that the cumulative $Al_2O_3$ contents of these phases are comprised between:
3 and 70% by weight of the total hydraulic binder, preferably between 7 and 50% by weight,
and more preferably between 20 and 30% by weight.

The hydraulic binders (a.ii) of the sulphoaluminate type, mainly forming ettringite on hydration. The sulphoaluminate clinkers are obtained from a mixture of calcium carbonate in the form of limestone, bauxite and calcium sulphate, which is either gypsum, anhydrite or hemihydrate. The main constituent at the end of the manufacturing process is Ye'elimite, C4A3$. A possible source of sulphoaluminate binder is CTS 25 Belitex (75% CSA, 25% gypsum).

SAP (b)

Preferably, the [SAP] (b) concentration is defined as follows, as a % of dry weight, in increasing order of preference:

$0.1 \leq [SAP] \leq 20$;

$0.2 \leq [SAP] \leq 15$;

$0.3 \leq [SAP] \leq 10$;

$0.4 \leq [SAP] \leq 7$;

$0.5 \leq [SAP] \leq 6$.

The SAPs are for example pulverulent polymers:
- capable of swelling by means of water or aqueous salt solutions to form a hydrogel, capable of absorbing at least 30, 50, 100, 200, 300, 400 times their weight, in increasing order of preference;
- crosslinked;
- having a high molecular weight;
- either anionic and/or cationic;
- and capable of being produced by radical polymerization of ethylenically unsaturated compounds (for example vinyl compounds) and by subsequent drying of the polymers obtained.

The hydrogels are, for example, gels containing water bound to hydrophilic polymers and crosslinked in three-dimensional networks.

Preferably, the SAP (b) is chosen from the group comprising, or even better constituted by:
- crosslinked sodium polyacrylates;
- crosslinked sodium acrylamide and acrylate copolymers;
- crosslinked sodium acrylate or acrylamide copolymers and copolymers of a compound comprising at least one group of the sulphonic and/or phosphonic type;
- hydrolyzed crosslinked starch and acrylonitrile copolymers;
- crosslinked maleic anhydride and ethylene copolymers;
- crosslinked carboxymethylcelluloses;
- crosslinked polyethylene oxide;
- and/or phosphoric acid grafted polyvinyl alcohol-based polymers;
- and mixtures thereof.

The crosslink density, the grain size and the anionicity of the SAP can vary.

Source of Aluminium Ions (c)

The source of aluminium ions (c) is preferably chosen from the following compounds, used singly or in combination:
- amorphous aluminas for example of the Axilat SA 502 type, aluminium phosphates, aluminium fluoride salts, aluminium carbonates, sodium aluminates, aluminium sulphate and alum salts for example of the mixed aluminium, sodium and potassium sulphates type, soluble aluminium salts preferably chosen from the group comprising, or even better constituted by: aluminium sulphate, aluminium chlorides and polychlorides, aluminium nitrates and nitrites, aluminium thiocyanate, aluminium citrate and mixtures thereof.

Other Components (Admixtures)

Advantageously, the composition according to the invention comprises, in addition to the components (a)-(b)-(c), at least one of the following components:
- (d) a setting retarder;
- (e) an additional setting accelerator;
- (f) a water-retaining agent;
- (g) a filler;
- (h) a lightweight filler;
- (i) a water repellent;
- (j) a colouring agent;
- (k) fibres;
- (l) an anti-foaming agent;
- (m) a redispersible powder resin;
- (n) a rheological agent;
- (o) an air-entraining or foaming agent;
- (p) a gas-generating agent;
- (q) a fire retardant.

Preferably, this composition has at least one of the following characteristics:
- (d) the setting retarder (d) is preferably chosen from the group comprising, or even better constituted by, calcium chelating agents, carboxylic acids and salts thereof, polysaccharides and derivatives thereof, phosphonates, lignosulphonates, phosphates, borates, and the salts of lead, zinc, copper, arsenic and antimony, and more particularly from tartaric acid and its salts, preferably its sodium or potassium salts, citric acid and its salts, preferably its sodium salt (trisodium citrate), sodium gluconates; sodium phosphonates; sulphates and their sodium or potassium salts, and mixtures thereof;
- (e) the additional setting accelerator (e) is chosen from the group comprising, or even better constituted by, the alkali and alkaline earth salts of hydroxides, halides, nitrates, nitrites, carbonates, thiocyanates, sulphates, thiosulphates, perchlorates, silica, aluminium, and/or from the carboxylic and hydrocarboxylic acids and salts thereof, alkanolamines, insoluble silicate compounds such as fumed silicas, fly ash, or natural pozzolanas, quaternary ammonium silicates, finely divided mineral compounds such as silica gels or finely divided calcium and/or magnesium carbonates and mixtures thereof; this additional setting accelerator (e) being preferably chosen from the group comprising, or even better constituted by, chlorides and their sodium or calcium salts; carbonates and their sodium or lithium salts, sulphates and their sodium or potassium salts, calcium hydroxides and formates and mixtures thereof;
- (f) the water-retaining agent (f) is chosen from the group comprising, or even better constituted by, the polysaccharides and preferably the cellulose or starch ethers and mixtures thereof, and preferably from the group comprising methylcelluloses, hydroxyethylcelluloses, methylhydroxypropylcelluloses, methylhydroxyethylcelluloses and mixtures thereof, or from the guar ethers, modified or not, and mixtures thereof or the mixture of these different families;
- (g) the filler (g) is chosen from the group comprising, or even better constituted by: fillers and/or sands, preferably from the siliceous, calcareous, silicocalcareous, magnesium sands and mixtures thereof, the siliceous, calcareous, silicocalcareous, magnesium fillers and mixtures thereof, and/or from the metallic oxides, aluminas, and/or from glass beads and the natural and synthetic mineral silicates, preferably chosen from clays, micas, metakaolins, fumed silicas, and mixtures thereof;
- (h) the lightweight filler (h) is chosen from the group comprising, or even better constituted by: expanded perlite, expanded vermiculite, silica aerogels, expanded polystyrene, cenospheres (fillites), alumina hollow balls, expanded clays, pumice, glass hollow balls (3M® type) or expanded glass granules (Poraver®, Liaver®), silicate foam grains, rhyolite (Noblite®);
- (i) the water repellent (i) is chosen from the group comprising, or even better constituted by, fluorinated, silanized, siliconated, siloxanated agents, fatty acid metal salts and mixtures thereof, preferably from the sodium, potassium and/or magnesium salts of oleic and/or stearic acids and mixtures thereof;

(j) the colouring agent (j) is chosen from the group comprising, or even better constituted by, the organic and/or mineral pigments, and more particularly from the oxides of iron, titanium, chromium, tin, nickel, cobalt, zinc, antimony, and/or from polysulphurated sodium aluminosilicates, carbon, the sulphides of cobalt, manganese, zinc, and/or from the high-transparency or highly infra-red-reflective pigments and mixtures thereof;

(k) The fibres (k) comprise mineral, animal, plant and synthetic fibres, more particularly chosen from the group comprising, or even better constituted by, polyamide, polyacrylonitrile, polyacrylate, cellulose, polypropylene, polyvinyl alcohol, glass, metal, flax, polycarbonate, sisal, jute, hemp fibres and mixtures of these fibres;

(l) The anti-foaming agent (l) is chosen from the group comprising, or even better constituted by, polyether polyols, hydrocarbonated molecules, siliconate molecules, hydrophobic esters, non-ionic surfactants, polyoxiranes and mixtures thereof;

(m) The redispersible powder resin (m) is chosen from the group comprising, or even better constituted by, the families of the acrylic homo- or copolymer resins, vinyl acetate-ethylene copolymers, styrene-acrylic copolymers, vinyl acetate, vinyl versatate and maleic acid dialkyl ester terpolymers, vinyl acetate and vinyl versatate copolymers, styrene and butadiene copolymers and mixtures thereof;

(n) The rheological agent (n) is chosen from the group comprising, or even better constituted by, thickeners, water-reducing plasticizers (mineral and/or organic) and mixtures thereof, and more preferably from the sub-group comprising, or even better constituted by, polysaccharides and derivatives thereof, polyvinyl alcohols, mineral thickeners, linear polyacrylamides, polynaphthalene sulphonates, polymelamine sulphonates, polycarboxylates and mixtures thereof;

(o) The air-entraining agents or foaming agents are chosen from:
  i. sources of anionic surfactants for example of the alkyl sulphate, alkyl ether sulphate, alkaryl sulphonate, alkyl succinate, alkyl sulpho succinate, alkoyl sarcosinate, alkyl phosphate, alkyl ether phosphate, alkyl ether carboxylate and alpha olefin sulphonate type, more preferably sodium lauryl sulphate.
  ii. Non-ionic surfactants of the ethoxylated fatty alcohol, mono- or di-alkyl alkanolamide, alkyl polyglucoside type,
  iii. Amphoteric surfactants of the alkyl amine oxide, alkyl betaine, alkyl amido propyl betaine, alkyl sulphobetaine, alkyl glycinate, alkyl amphopropionate, alkyl amidopropyl hydroxysultaine type.

(p) The agents that generate gas in situ are chosen from the admixtures that, on contact with the compositions according to the invention, generate oxygen, hydrogen, nitrogen, carbon monoxide or dioxide, ammonia, methane. They can be chosen from the admixtures described in U.S. Pat. No. 7,288,147 and in particular from the families of azodicarbonamide, sodium bicarbonate, organic or inorganic peroxides, toluenesulphonyl hydrazide, benzenesulphonyl hydrazide, toluenesulphonyl acetone hydrazone, toluenesulphonyl semicarbazide, phenyltetrazole, sodium borohydride, dinitroso pentamethylenetetramine;

(q) The fire retardants are preferably chosen from the group comprising, or even better constituted by, flame-retarding agents having chemical and/or physical action, halogenated flame-retarding agents, phosphorated flame-retarding agents, nitrogenated flame-retarding agents, intumescent systems, mineral flame-retarding agents, metal hydroxides, zinc compounds, borates, antimony oxides, nanocomposites based on aluminium silicate-based clays and mixtures thereof;
  preferably from the sub-group comprising, or even better constituted by, Tetrachlorobisphenol A (TBBPA), chloroparaffins, organic phosphates, red phosphorus, phosphonates, phosphinates, melamine, its salts and homologues, aluminium or magnesium hydroxides, zinc hydroxystannates, zinc borate and mixtures thereof.

The admixtures (d) to (q) serve to standardize the properties of the material and make it possible to meet the specific requirements of each application of the dry (e.g. cementitious) composition: mortar, render, adhesive.

The setting retarders (d) and additional setting accelerators (e) are products that modify the solubilities, dissolution speeds and hydration speeds of the various constituents of the dry cementitious composition.

The water-retaining agent (f) has the property of retaining the mixing water before setting. The water is thus kept in the render, mortar or concrete paste, giving it very good adherence and good hydration. To a certain extent, it is less absorbed on the support, surface release is restricted and thus there is little evaporation.

The nature of the filler (g) and/or of the lightweight filler (h) can vary according to the final application of the composition. Examples of filler (g) for different final applications are given below:
  thick mineral coverings or thin mineral coverings: the filler is chosen from sands and/or aggregates, preferably from siliceous, calcareous and silicocalcareous sands and mixtures thereof. The filler (g) can optionally be supplemented by at least one filler of the type defined below,
  Paints: the filler is chosen from the mineral fillers, preferably from the calcareous fillers,
  Adhesives: the fillers can be fillers chosen from the mineral fillers, preferably from the calcareous fillers and/or sands, preferably chosen from siliceous, calcareous and silicocalcareous sands and mixtures thereof,
  Solid hardened products for the construction industry: the fillers can be fillers chosen from the mineral fillers, preferably from the calcareous fillers and/or sands, preferably chosen from siliceous, calcareous and silicocalcareous sands and mixtures thereof.

The water-repellent (i) aims to decrease the penetration of water into the dry composition or the hardened product. Sodium oleate or magnesium stearate may be mentioned by way of example.

The colouring agent (j) aims to give the hardened product the desired hue. Iron oxide $Fe_2O_3$ or titanium dioxide $TiO_2$ may be mentioned by way of example.

The fibres (k) aim to improve the mechanical strength of the hardened product. Polyacrylonitrile fibres may be mentioned by way of example.

The anti-foaming agents (l) are used to increase the cohesion of the render by limiting the presence of air bubbles. They make it possible to reduce the secondary effect of other additives or as a consequence of mixing, entraining air. Polyether polyols may be mentioned as examples of anti-foaming agents (l).

The redispersible powder resins (m) aim to increase adherence and elasticity. Vinyl Acetate Ethylene copolymers may be mentioned by way of example.

The rheological agents (n) aim to modify the consistency of the wet product to adapt it to its application. Sepiolites and xanthane gums may be mentioned by way of example.

The foaming agents (o) aim to supply additional porosity by air entrainment during the mixing of the mineral binder.

The agents that generate gas in situ (p) aim to supply additional porosity by generating air in situ during the mixing of the mineral binder.

The fire retardants (q) protect the hardened product against fire.

The invention also relates to the combinations of components (a) to (q), capable of being supplied separately in order to reconstitute the above-mentioned dry cementitious composition at the time of use.

In particular, these can be ready-to-use mixtures comprising either a single component with all of the necessary components (a) to (q), or more than one component, for example two components comprising, on the one hand, one portion of the above-mentioned components (a) to (q) and, on the other hand, the other portion of the above-mentioned components (a) to (q).

Mixing Ratio

According to a remarkable characteristic of the invention, the composition according to the invention is designed in order that the wet formulations for the construction industry that it makes it possible to obtain have a mixing ratio greater than or equal to, as a % by weight and in increasing order of preference: 20; 25; 30; 40; 50; 60; 70; 80; 90; 100.

According to another remarkable characteristic of the invention, the dry composition is designed in order that the wet formulations for the construction industry that it makes it possible to obtain have a mixing ratio increased by a factor of 1.5, preferably 2, compared with a control composition without SAP.

Wet Formulation

According to another aspect, the invention relates to a wet formulation formed by a mixture of water and the above-defined dry (e.g. cementitious) composition.

In particular, this wet formulation can be used to obtain lightweight hardened products for the construction industry, such as exterior or interior coverings or renders (e.g. exterior thermal insulation system (ETI)/decoration/protection/waterproofing), adhesives, solid objects, etc.

Advantageously, this wet formulation for the construction industry is characterized in that it comprises the above-defined composition according to the invention and a liquid, for example water, preferably at a mixing ratio greater than or equal to, as a % by weight and in increasing order of preference: 20; 25; 30; 40; 50; 60; 70; 80; 90; 100.

Hardened Products for the Construction Industry

The invention also relates to the hardened products for the construction industry obtained from the above-mentioned wet formulation and/or that obtained by the method defined below, namely in particular the following hardened products:

products produced on site by hardening of the wet formulations resulting from mixing the compositions according to the invention, e.g.:

Thin-set mortars, mortar joints, resurfacing renders, smoothing renders;

Screeds, lightweight screeds for underfloor heating;

Exterior coverings of the Thick or Thin Mineral Coverings type and mineral paints;

Components of the Exterior Thermal Insulation (ETI) systems including insulation adhesive, the under layer used to fix the lath and the exterior finishing render;

Tile adhesives;

Tiling Grouts;

Pointing renders;

Interior and exterior renders, for example single-layer renders;

Insulating material for the exterior or interior of buildings;

Filling mortars or concretes;

Caulking and sealing mortars, concrete repair mortars, frost-resistant mortars, concrete waterproofing systems, waterproof membranes;

Grouts, lightweight grouts for cementing oil wells;

Lightweight mortars or concretes intended to be put in place by spraying or pouring into hollow walls or into permanent formworks for producing new buildings or renovating old buildings.

products prefabricated in an industrial environment by hardening of the wet formulations resulting from mixing the compositions according to the invention, e.g.:

Lightweight prefabricated panels intended for the erection of buildings (load-bearing elements for the structure or insulation panels);

Lightweight concrete blocks intended to be used as structural, insulating or cladding elements;

Prefabricated elements, such as window sills, angle beams, mouldings, etc.

Building or Civil Engineering Structures

The invention also relates to building or civil engineering structures produced at least partly with a wet formulation, this formulation hardening after application and shaping, or from hardened construction products.

Methods

The invention also relates to the methods for preparing the above-mentioned dry (e.g. cementitious) composition, the above-defined wet formulation and the method for application on a building surface or for manufacturing hardened products for the construction industry, building or civil engineering structures by means of the wet formulation according to the invention.

These methods are easily implemented by construction workers.

The method for preparing the dry (e.g. cementitious) composition according to the invention essentially consists of mixing the components of said composition.

The method for preparing the wet formulation according to the invention essentially consists of blending a liquid, preferably water, with all or some of the components of the composition according to the invention, as defined above, the remainder of the components then being incorporated gradually into the mixture if this has not been done beforehand.

This mixing process can be discontinuous: in the tank of a cement gun, water is mixed with a ready-to-use mixture comprising all or some of the constituents (a) to (q). The blending time is preferably equal to 1 to 30 min, or even 3 to 10 min. Certain components can be incorporated gradually.

The method for application on a building surface or for manufacturing a building or civil engineering structure, by means of the wet formulation according to the invention.

Use of a SAP

A subject of the invention is the use of at least one SuperAbsorbent Polymer (SAP) to increase the hydration rate of a dry composition based on hydraulic binder (a), incorporating at least one SuperAbsorbent Polymer (SAP) (b) and a source of aluminium ions (a) and/or (c), and intended for the preparation of a wet formulation for the construction industry.

Application by Spraying

Another subject of the invention is the application of the previously defined wet formulation by spraying onto a building surface, preferably onto a wall. These can be new buildings or buildings being renovated.

Supports

The invention also relates to the supports (concrete, render, ETI system, etc.) covered by the hardened wet formulation according to the invention.

I. Materials Used:

I.1 Binders (a) that are Sources of Alumina (c)

Calcium aluminates

TERNAL® RG from Kerneos®
[—CaO.Al2O3-2CaO.Al2O3.SiO2-12CaO.7Al2O3-2CaO.SiO2-4CaO.Al2O3.Fe2O3]

DENKA® SC-1 from Newchem®
[Al2O3 22-25%-CaO 39-45%-SO3 26-30%]

TERNAL® WHITE, binder consisting mainly of CA, $CA_2$ and secondarily of $C_{12}A_7$, Aα. Alumina content>68%, CaO content<31%, Blaine specific surface area>3,700 $cm^2/g$. Supplier: Kerneos. Production site: Le Teil (Fr).

Sulphoaluminate cement:

The sulphoaluminate binder is CTS 25 Belitex (75% CSA, 25% gypsum).

I.2 Binders (a) that are not Sources of Alumina (c)

Portland cement CEM I, 52.5N.

Sulphates: Prestia selecta: very finely-ground beta hemihydrate: 0.1%>160 microns.

Lime: Aerated lime: Chaubat CL90 from Bonargent-Goyon

White hydraulic lime NHL-3.5Z CE marketed by Lafarge cements, Cruas factory. Composition: Lime 89%, CEM II/A-LL 42.5 N CE PM-CP2 NF "white: 11%.

I.3 SuperAbsorbent Polymer (b)

Aquasorb® 3005S: Crosslinked potassium acrylamide and acrylate copolymer from SNF® FLOERGER.

Luquasorb® FP800 from BASF®: crosslinked sodium polyacrylate.

I.4 Source of Alumina (c) Other than the Binder (a)

SA 502 Axilat®: 100% amorphous "flash" alumina from Momentive®.

I.5 Retarder (d)

Fine granular anhydrous citric acid, from Gadot Biochemical Industries, water content 0.2% max, 5% maximum will not pass through a 590 micrometer sieve.

I.6 Additional Setting Accelerator (e)

Fine grade lithium carbonate from RODACHEM. $Li_2CO_3$ content>99%. Density 2.049 $g/cm^3$, average grain size 66 μm.

Calcium formate
1. Technical grade from PERSTORP; calcium formate content greater than 98%, maximum 35% of particles having a diameter>250 μm.
2. Calcium formate 98%-SD-BY— from TRANSWORLD TRADING; calcium formate content greater than 98%.

Sodium chloride: Salinor fine salt from SALINS DU MIDI & SALINES.

I.7 Water-Retaining Agent (f)

Cellulose ether: METHOCEL® 306 of typical viscosity 38,000 mPa·s (Brookfield rotary viscosimeter, model RV, 20 rpm, 2% in water at 20° C.).

Starch ether: Solvitose® H20/60: Pregelatinized starch ether, pH 11 for a 5% solution, Brookfield Viscosity (6.8% solution in demineralized water at 25° C., n=20 min-1, no. 4 spindle): approximately 15,000 mPa·s.

I.8 Filler (g)

Sand (PE2LS) or Fulchiron PE2LS: silica sand with a maximum diameter less than or equal to 0.4 mm (Supplier: Fulchiron quarries).

I.9 Water Repellent (i)

Magnesium stearate: technical grade marketed by Peter Greven.

Magnesium soap obtained from technical grade stearine.

Sodium oleate: fine powder, white to light yellow in colour, marketed by Peter Greven.

Sodium soap obtained with technical oleic acid.

I.10 Colouring Agent (j)

Bayferrox Rouge 110 pigment: synthetic iron oxide α $Fe_2O_3$, 96% $Fe_2O_3$, barite binder, relative colouring power between 95 and 105%, marketed by Bayer.

I.11 Fibres (k)

Polyacrylonitrile fibre FPAC 243/125, marketed by STW SCHWARWALDER TEXTIL WERKE, specific density 1.18 g/cm3, maximum moisture content 2%, approximate length 0.8 mm.

I.12 Anti-Foaming Agent (l)

PERAMIN DEFOAM® 50 PE from KERNEOS®. Mixture of hydrophobic esters, white powder, grain size: 99%<600 μm.

I.13 Re-Dispersible Powder Resin (m)

Re-dispersible polymer powder (VINNAPAS 5010N):

Water-redispersible resin from WACKER®. Ethylene vinyl acetate copolymer. Solid matter 98-100%, ash: 8-13% polyvinyl alcohol protective colloid, grain size max. 4% does not pass through 400 μm, predominant grain size 0.5-8 μm, film formation temperature 4° C.

I.14 Rheological Agent (n)

Thickener: Pangel® S9: sepiolite produced by TOLSA®. Mineral clay belonging to the phyllosilicates family, the chemical nature of which is a hydrated magnesium silicate. Composition: Sepiolite (asbestos free) 85%, Other clays 15%.

Plasticizer: Melment® F10: superplasticizer based on polymelaminesulphonate for cement- or calcium sulphate-based mortars.

I.15 Air-Entraining or Foaming Agent (o)

Hostapur OSB: sodium and olefin sulphonate salt, active ingredient content close to 100%, supplied by Shin Etsu.

II. Tests:

The standard used in the test for determining the flexural and compressive strengths is NF EN 196-1.

III. Mortars:

Operating Procedure

Preparation of the Dry Mixes:

The raw materials in powder form are weighed independently depending on the formulation. The raw materials are then mixed in a powder mixer of the "GUEDU" type for 3 minutes.

Mixing the "Dry Mixes"

The dry mortars obtained are mixed with the water necessary in order to obtain a homogeneous paste, in a planetary mixer of the "PERRIER" type, for one minute and thirty seconds.

III.1 Examples of Basic Mortars Having a Portland Type Cement Binder:

| Binder (a): Portland cement | Test-1 | Test-2 | Test-3 | Test-4 | Test-5 | Test-6 | Test-7 |
|---|---|---|---|---|---|---|---|
| Source of alumina | SA 502 | TERNAL RG | DENKA SC-1 | TERNAL RG | DENKA SC-1 | TERNAL RG | TERNAL RG |
| Superabsorbent (Aquasorb 3005S) | 0.5 | 3 | 4 | 5 | 5 | 2.5 | 0 |
| Portland cement CEM I, 52.5N | 86.52 | 95.48 | 94.49 | 82.61 | 93.51 | 61.36 | 61.36 |
| Aluminate | 12.97 | 1.52 | 1.51 | 12.39 | 1.49 | 6.14 | 6.14 |
| Sand (PE2LS) | 0 | 0 | 0 | 0 | 0 | 30 | 32.5 |
| Mixing ratio (%) | 71.00 | 130.00 | 147.57 | 180.00 | 168.57 | 87.50 | 25.50 |
| Quantity of powder (kg/l of paste) | 0.98 | 0.62 | 0.56 | 0.47 | 0.50 | 0.82 | 1.70 |
| Flexural strength F (21 days) | 1.8 | 2.5 | 1.7 | 1.1 | 2.0 | 2.8 | 4.1 |
| Compressive strength C (21 days) | 15.6 | 6.2 | 3.6 | 2.1 | 3.8 | 6.7 | 58.8 |

III.2 Examples of Basic Mortars Having an Aluminous Type Cement Binder:

| Binder (a): CAC | Test-8 | Test-9 | Test-10 | Test-11 |
|---|---|---|---|---|
| Superabsorbent (Aquasorb 3005S) | 0.5 | 5 | 2.5 | 0 |
| CAC (Ternal White) | 69.65 | 66.5 | 33.25 | 35 |
| Sulphates (Prestia selecta) | 29.85 | 28.5 | 14.25 | 15 |
| Lithium Carbonate | 0.28 | 0.27 | 0.13 | 0.14 |
| Sand (PE2LS) | 0 | 0 | 50 | 50 |
| Mixing ratio (%) | 45 | 152.2 | 89 | 21.75 |
| Quantity of powder (kg/l of paste) | 1.28 | 0.53 | 0.80 | 1.71 |
| Flexural strength F (21 days) | 1.7 | 1.0 | 1.2 | 7.1 |
| Compressive strength C (21 days) | 38.0 | 1.9 | 1.7 | 53.6 |

III.3 Examples of Basic Mortars Having a Ternary Mix Binder (Portland Cement/Aluminous Cement/Sulphates):

| Binder (a): Ternary mix | Test-12 | Test-13 |
|---|---|---|
| Superabsorbent (Aquasorb 3005S) | 0.5 | 4 |
| Portland cement CEM I, 52.5N | 60.31 | 58.19 |
| CAC (Ternal White) | 27.13 | 26.18 |
| Sulphates (Prestia selecta) | 12.06 | 11.63 |
| Mixing ratio (%) | 77.50 | 165.71 |
| Quantity of powder (kg/l of paste) | 0.76 | 0.51 |
| Flexural strength F (21 days) | 0.6 | 0.5 |
| Compressive strength C (21 days) | 5.0 | 1.0 |

III.4 Examples of Basic Mortars Having a Sulphoaluminate Type Cement Binder:

| Binder (a): CSA | Test-14 | Test-15 | Test-16 |
|---|---|---|---|
| Superabsorbent (Aquasorb 3005S) | 0.5 | 4 | 0 |
| Calcium sulphoaluminate CSA cement | 74.62 | 72 | 33.75 |
| Gypsum | 24.87 | 24 | 11.25 |
| Sand (PE2LS) | 0 | 0 | 55 |
| Mixing ratio (%) | 47 | 153 | 20.5 |
| Quantity of powder (kg/l of paste) | 1.20 | 0.53 | 1.74 |
| Flexural strength F (21 days) | 3.5 | 0.8 | 6.3 |
| Compressive strength C (21 days) | 31.52 | 1.84 | 47.07 |

IV. Tiling Adhesives:

| | Test-17 | Test-18 | Test-19 |
|---|---|---|---|
| Source of alumina | Calcium formate | SA502 | TERNAL RG |
| Portland cement CEM I, 52.5N | 88.8 | 88.8 | 88.8 |
| Superabsorbent (Aquasorb 3005S) | 2.2 | 2.2 | 2.2 |
| Starch ether (Addilose 200R) | 0.7 | 0.7 | 0.7 |
| Re-dispersible polymer powder (VINNAPAS 5010N) | 6.1 | 6.1 | 6.1 |
| CALCIUM FORMATE | 2.2 | 0 | 0 |
| Amorphous alumina (SA502) | 0 | 2.2 | 0 |
| Binder (a): calcium aluminate (TERNAL RG) | 0 | 0 | 2.2 |
| Total | 100 | 100 | 100 |
| Mixing ratio (%) | 72.00 | 105.00 | 92.50 |
| Quantity of powder (kg/l of paste) | 0.80 | 0.65 | 0.68 |

The invention claimed is:

1. A dry composition for preparation of a wet formulation for the construction industry comprising (a) one or more mineral binder(s) component, (b) at least one SuperAbsorbent Polymer SAP and an (c) a setting accelerator component,
   wherein the mineral binder(s) component and/or setting accelerator component is a source of aluminium ions;
   wherein the aluminium ions from the setting accelerator component is selected from the group consisting of aluminum chloride, aluminum polychlorides, aluminum nitrates and nitrites, aluminum thiocyanate, aluminum citrate, amorphous aluminas, aluminium phosphates, aluminium fluoride salts, aluminium carbonates, sodium aluminates, aluminium sulphate and alum, sodium and potassium salts, soluble aluminium salts and mixtures thereof;
   wherein the aluminium ions from the mineral binder(s) component comprises calcium aluminate cements (CAC), calcium sulphoaluminate (CSA) cements, and/or binders having a high content of alumina-rich cementitious phases, comprising at least one phase chosen from $C_3A$, $CA$, $C_{12}A_7$, $C_{11}A_7CaF_2$, $C_4A_3\$$ (ye'elimite), $C_2A_{(1-x)}F_x$, amorphous hydraulic phases having a molar ratio C/A anywhere from 0.3 to 15, and such that cumulative $Al_2O_3$ contents of said phases comprise 7 to 50% by weight, and wherein $C=CaO$; $A=Al_2O_3$; $F=Fe_2O_3$; $\$=SO_4$; and, x is any number from 0 to 1.

2. The dry composition according to claim 1, wherein a concentration of the mineral binder component is 15-95% by dry weight.

3. The dry composition according to claim 1, wherein the source of aluminium ions is provided by the setting accelerator component.

4. The dry composition according to claim 1, wherein a concentration of the mineral binder component is 15-99.5 weight % and a concentration of the setting accelerator component is 0.10-20 weight %.

5. The dry composition according to claim 1, wherein the mineral binder component is selected from the group consisting of
   (i) Portland cements and/or slag cements, geopolymer cements, natural pozzolanas, fly ash, supersulphated cements, calcium sulphates (gypsum, hemihydrate and/or anhydrite) and/or lime (unslaked, slaked and/or hydraulic);
   (ii) optionally calcium aluminate cements (CAC), calcium sulphoaluminate (CSA) cements, binders having a high content of alumina-rich cementitious phases; and optionally hydraulic binders comprising:
      at least one phase chosen from $C_3A$, $CA$, $C_{12}A_7$, $C_{11}A_7CaF_2$, $C_4A_3\$$ (ye'elimite), $C_2A_{(1-x)}F_x$ (with $C \rightarrow CaO$; $A \rightarrow Al_2O_3$; $F \rightarrow Fe_2O_3$; $\$ \rightarrow SO_4$ and x belonging to 0, 1),
      amorphous hydraulic phases having a molar ratio C/A comprised from 0.3 to 15, and such that cumulative $Al_2O_3$ contents of said phases are comprised from: 7 to 50% by weight.

6. The dry composition according to claim 1 wherein said SAP concentration is defined as follows, as a % of dry weight:

$$0.1 \leq [SAP] \leq 20.$$

7. The dry composition according to claim 1 wherein SAP is at least selected from the group consisting of:
   crosslinked sodium polyacrylates;
   crosslinked acrylamide and acrylate copolymers;
   crosslinked sodium acrylate or acrylamide copolymers and copolymers of a compound comprising at least one group of the sulphonic and/or phosphonic type;
   hydrolyzed crosslinked starch and acrylonitrile copolymers;
   crosslinked maleic anhydride and ethylene copolymers;
   crosslinked carboxymethylcelluloses;
   crosslinked polyethylene oxide;
   and/or phosphoric acid grafted polyvinyl alcohol-based polymers;
   and mixtures thereof.

8. The dry composition according to claim 1 wherein said source of aluminium ion is selected from the group consisting of:
   aluminium sulphate, aluminium chlorides and aluminium polychlorides, aluminium nitrates and nitrites, aluminium thiocyanate, aluminium citrate and mixtures thereof.

9. The dry composition according to claim 1 wherein said dry composition is designed such that it is capable to be mixed with water to prepare a wet formulation, at a mixing ratio greater than or equal to 20%.

10. The dry composition according to claim 1 wherein said dry composition further comprises at least one of the following components:
   (d) a setting retarder;
   (e) an additional setting accelerator;
   (f) a water-retaining agent;
   (g) a filler;
   (h) a lightweight filler;
   (i) a water repellent;
   (j) a colouring agent;
   (k) fibres;
   (l) an anti-foaming agent;
   (m) a redispersible powder resin;
   (n) a rheological agent;
   (o) an air-entraining or foaming agent;
   (p) a gas-generating agent;
   (q) a fire retardant.

11. A wet formulation for the construction industry comprising the dry composition of claim 1 and a liquid, optionally water, optionally at a mixing ratio greater than or equal to, as a % by weight, at least one of the following: 20; 25; 30; 40; 50; 60; 70; 80; 90; 100.

12. A method for preparing the wet formulation according to claim 11, said method comprising blending a liquid, optionally water, with all or at least a portion of the composition according to claim 1 to form a mixture, and optionally gradually incorporating any remainder of the composition into the mixture.

13. A method for application on a building surface or for fabricating a building or civil engineering structure, comprising using the wet formulation according to claim 11 for the application on a building or for fabricating a building or civil engineering structure.

* * * * *